US012258922B2

(12) United States Patent
Arumugam

(10) Patent No.: US 12,258,922 B2
(45) Date of Patent: Mar. 25, 2025

(54) PISTON FOR ASSEMBLY WITH A CYLINDER

(71) Applicant: Cummins Inc., Columbus, IN (US)

(72) Inventor: Raghuvaran Arumugam, Countesthorpe (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/499,489

(22) Filed: Nov. 1, 2023

(65) Prior Publication Data

US 2024/0175407 A1 May 30, 2024

Related U.S. Application Data

(60) Provisional application No. 63/428,896, filed on Nov. 30, 2022.

(51) Int. Cl.
*F02F 3/02* (2006.01)

(52) U.S. Cl.
CPC .................................... *F02F 3/025* (2013.01)

(58) Field of Classification Search
CPC ..... F02F 3/025; F02F 3/027; F16J 1/00; F16J 1/02; F16J 1/04
See application file for complete search history.

(56) References Cited

U.S. PATENT DOCUMENTS 975,301 A 11/1910 Talbot
RE17,183 E 1/1926 Day
1,566,547 A 1/1926 Day
1,786,642 A 6/1930 Smith
4,158,328 A * 6/1979 Beardmore ................ F16J 1/04 123/193.4
4,683,808 A * 8/1987 Wacker ..................... F02F 3/02 92/208
8,857,401 B2 * 10/2014 Gunning ................... F02F 3/00 123/193.6
11,047,293 B1 * 6/2021 Schroeder ............. F02F 3/0015
(Continued)

FOREIGN PATENT DOCUMENTS

DE 19851000 A1 4/1997

OTHER PUBLICATIONS

Extended European Search Report; European Patent Office; European Patent Application No. 23207487.2; Apr. 5, 2024; 6 pages.

*Primary Examiner* — Grant Moubry
*Assistant Examiner* — James G Moubry
(74) *Attorney, Agent, or Firm* — Taft Stettinius & Hollister LLP

(57) ABSTRACT

A piston for assembly with a cylinder of an internal combustion engine. The piston includes a piston body having a longitudinal axis that extends from a crown to a bottom of the piston body. The piston body defines a pin opening having a piston pin axis for receipt of a piston pin. A piston skirt is assembled with and exterior to the piston body. The piston skirt includes a first skirt pocket and a second skirt pocket, wherein the first and second skirt pockets are positioned above the piston pin axis. The piston skirt includes a lower skirt positioned below the piston pin axis. Outer surfaces of the first and second skirt pockets are recessed laterally relative to an outer lower skirt surface of the lower skirt. The outer lower skirt surface of the lower skirt is longitudinally aligned with an outer surface of an upper land.

20 Claims, 7 Drawing Sheets

(56) References Cited

U.S. PATENT DOCUMENTS

| | | | | |
|---|---|---|---|---|
| 2008/0134876 | A1* | 6/2008 | Scharp | F02F 3/22<br>123/193.6 |
| 2008/0202330 | A1* | 8/2008 | Ottliczky | F02F 3/00<br>92/208 |
| 2011/0114054 | A1* | 5/2011 | Miller | F02F 3/00<br>123/193.6 |
| 2011/0197868 | A1* | 8/2011 | Engel | F02F 3/24<br>123/73 PP |
| 2013/0233270 | A1* | 9/2013 | Brandt | F02F 3/0076<br>123/193.6 |
| 2017/0241374 | A1* | 8/2017 | Scherbaum | F02F 3/0076 |
| 2017/0260927 | A1* | 9/2017 | Weinenger | F02F 3/22 |
| 2018/0051649 | A1* | 2/2018 | Loew | F02F 3/24 |
| 2018/0051650 | A1* | 2/2018 | Loew | F02F 3/0076 |
| 2018/0202346 | A1 | 7/2018 | MacKenzie | |
| 2021/0215118 | A1* | 7/2021 | Schmoll | B22D 15/02 |
| 2021/0270367 | A1* | 9/2021 | Augustin, Sr. | F16J 1/02 |
| 2023/0417203 | A1* | 12/2023 | Petrus | C22C 21/00 |

* cited by examiner

PISTON FOR ASSEMBLY WITH A CYLINDER

CROSS-REFERENCE TO RELATED APPLICATION

The present application claims the benefit of the filing date of U.S. Provisional Application No. 63/428,896 filed on Nov. 30, 2022, which is incorporated herein by reference.

TECHNICAL FIELD

The present disclosure relates generally to a piston for an internal combustion engine, and more particularly to a piston having a short skirt.

BACKGROUND

There is a continuing need for improvement to withstand high mechanical and thermal distortions of a piston while eliminating scuffing on a piston of an internal combustion engine. Scuffing on the piston removes or polishes the crosshatch on the cylinder bore, which is called bore polishing. Bore polishing thereby removes the ability to retain oil film between the piston skirt and the cylinder bore. Without a thin oil film between the piston skirt and the cylinder bore, the piston will continue to heat up due to high friction. The high frictional heating causes the material to weld together and eventually be wiped away due to piston motion. Scuffing seen on the lower end piston skirt is usually due to tight clearances between skirt and bore, bore distortion, and/or skirt compliance. Piston skirt can facilitate maintaining the desired clearance and hydrodynamic lubrication between the skirt and bore at various running conditions. There is a continuing need to have compliant piston skirt designs and improve ease of manufacturing of the skirt on the piston, especially in pistons used in 2 stroke engines.

SUMMARY

A piston for an internal combustion engine is disclosed. The internal combustion engine includes at least one cylinder that has a combustion chamber. The piston includes a piston body having a longitudinal axis that extends from a crown to a bottom. The piston body defines a pin opening having a piston pin axis. The piston includes a piston skirt assembled with and exterior to the piston body. The piston skirt includes a first skirt pocket and a second skirt pocket, wherein the first and second skirt pockets are positioned above the piston pin axis. The piston skirt also includes a lower skirt positioned below the piston pin axis. The lower skirt has an outer lower skirt surface. Each of the first and second skirt pockets has an outer skirt pocket surface that is recessed laterally relative to the outer lower skirt surface of the lower skirt.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 1:
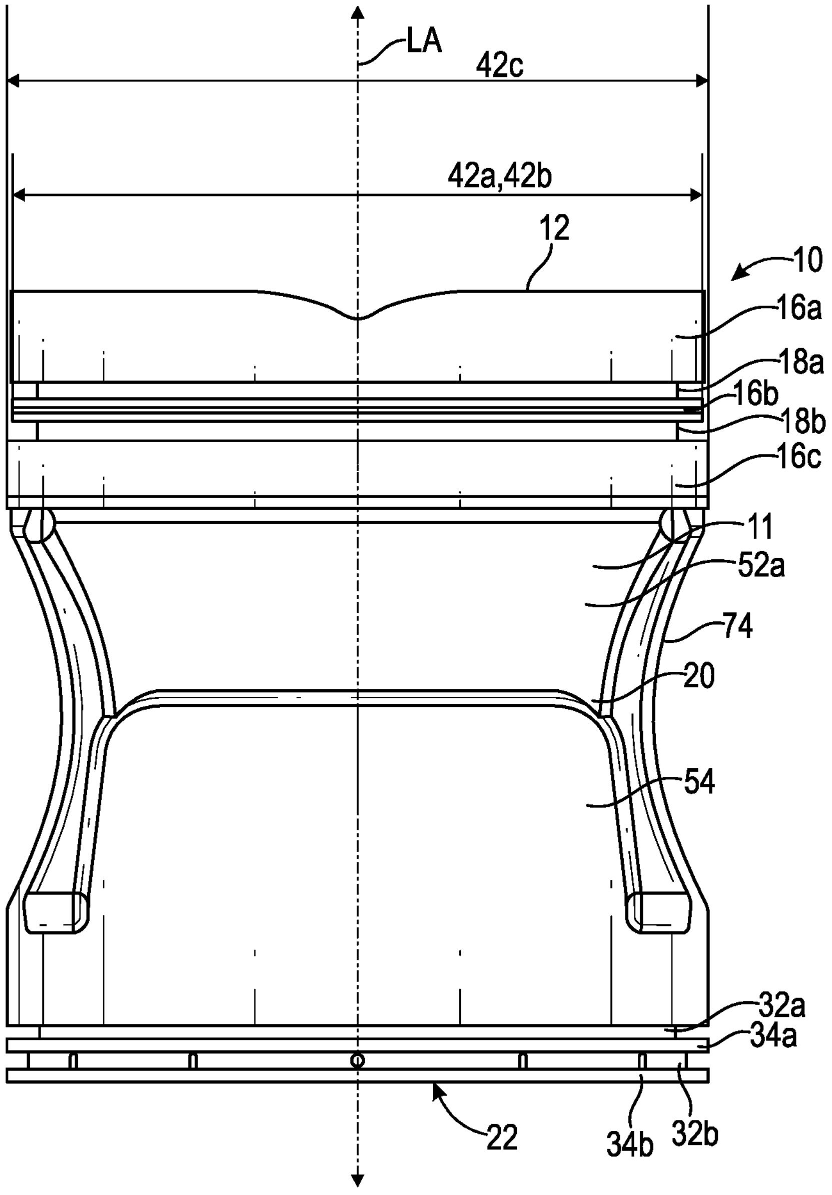
FIG. 1 is a side view of a piston of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Internal combustion engines include one or more cylinders wherein each cylinder includes a piston, such as piston 10 (shown in FIGS. 1-3), in the cylinder bore. During a combustion cycle, the piston moves in an upstroke direction and a downstroke direction relative to the cylinder bore. During the primary motion wherein the piston moves in either an upstroke direction or a downstroke direction along the cylinder bore center line, the piston also tilts back and forth or side to side in a secondary motion which causes rocking or tilting of the piston. The piston described herein includes a skirt having the ability to withstand high mechanical and thermal distortions while also simplifying manufacturability of the skirt on the piston.

Figure 2:
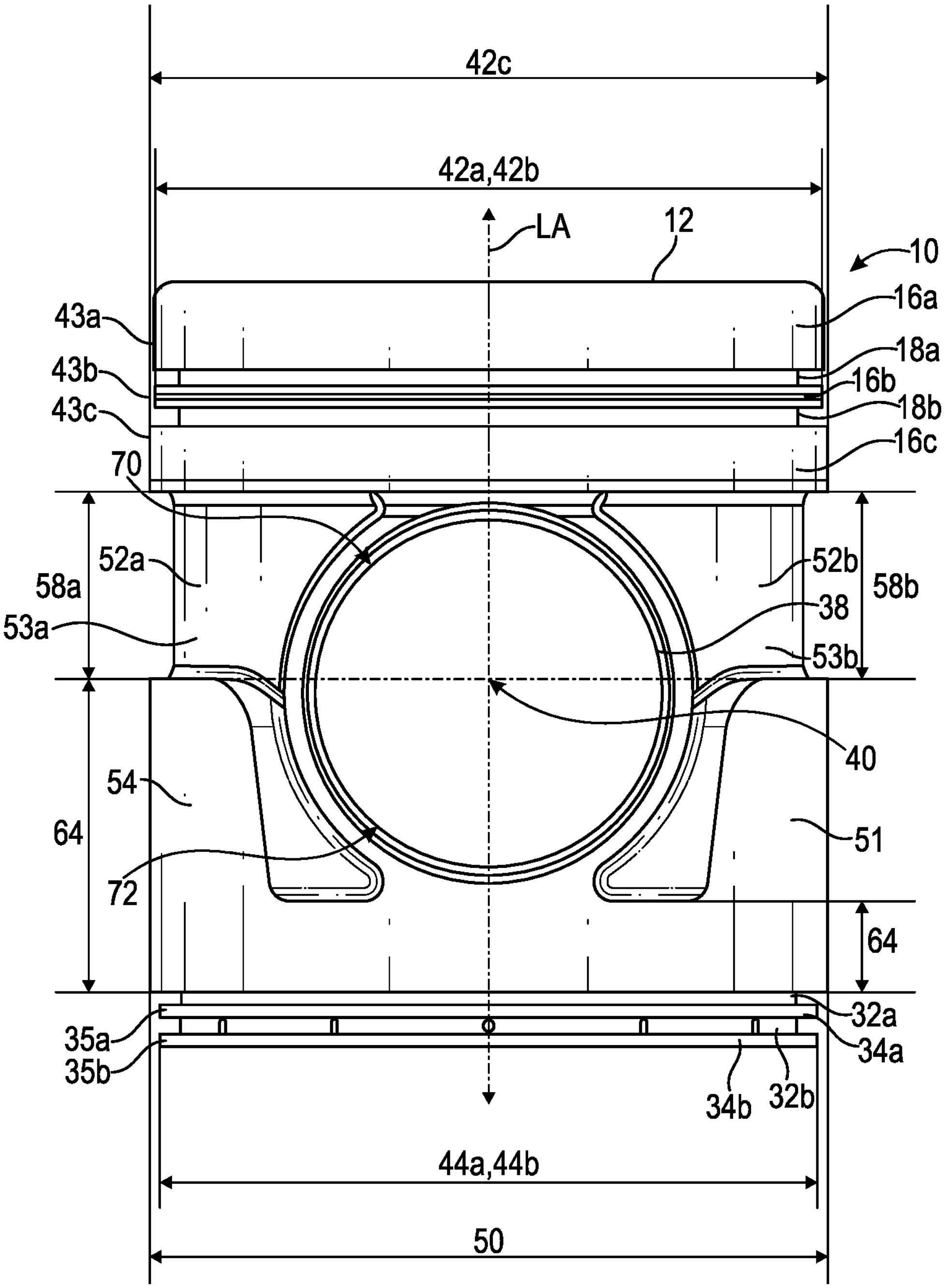
FIG. 2 is a side view of the piston of FIG. 1 that illustrates a thrust plane view of the present disclosure.
Figure 3:
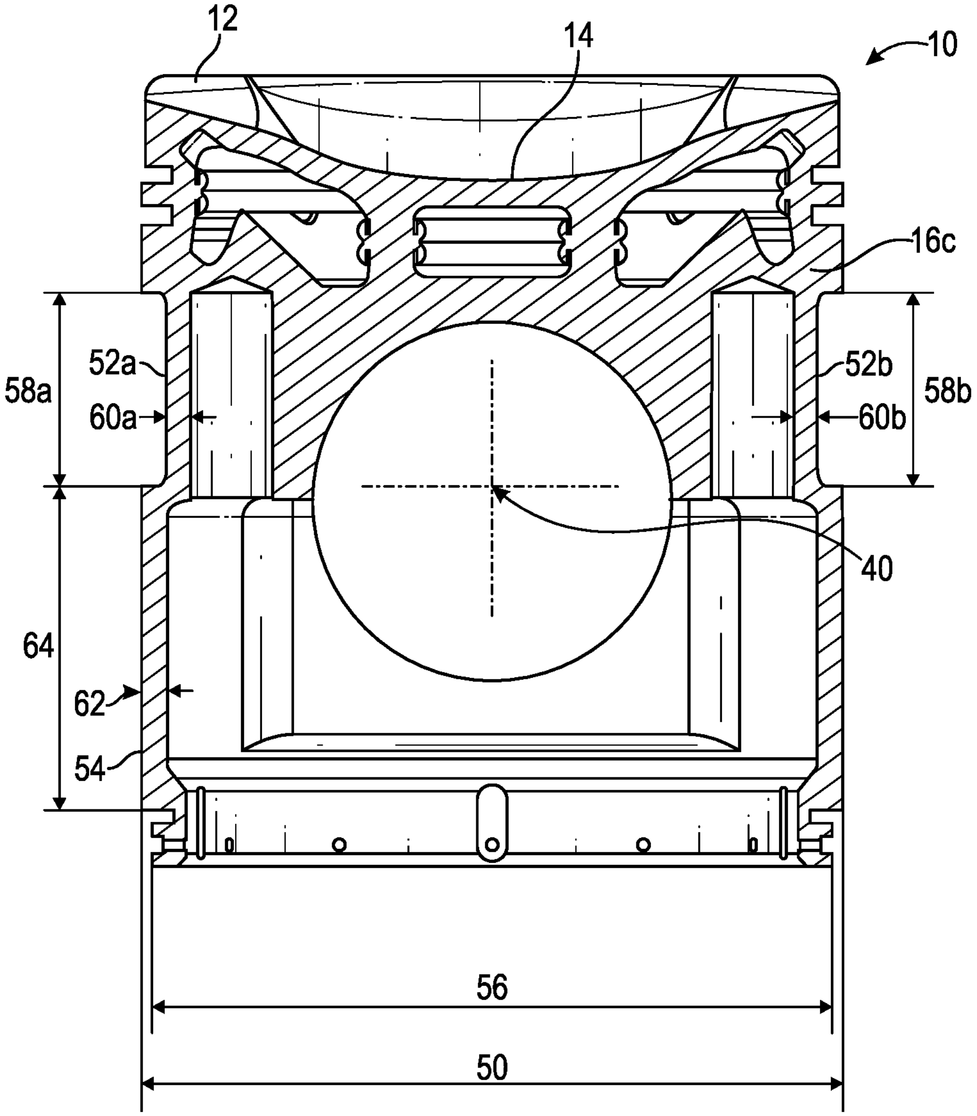
FIG. 3 is a cross section of the piston of FIG. 1 of the present disclosure.

FIGS. 1-3 show various aspects of a piston 10. The piston 10 includes a piston body 11 and a piston skirt 20. The piston body 11 includes a longitudinal axis LA that extends from a crown 12 to an underside or bottom 22. The piston 10 can further include the crown 12, a bowl 14, an upper land 16 (and may include a plurality of upper lands 16*a*, 16*b*, 16*c*), at least one upper ring groove 18 (such as a plurality of upper ring grooves 18*a*, 18*b*), the underside or bottom 22, at least one lower ring groove 32 (such as a plurality of lower ring grooves 32*a*, 32*b*), and at least one lower land 34 (such as a plurality of lower lands 34*a*, 34*b*). Piston rings (not illustrated) may be provided in upper ring grooves 18*a*, 18*b*, and lower ring grooves 32*a*, 32*b*.

The piston 10 includes an oil hole or opening 38 sized to receive a piston pin (not illustrated). The oil hole or opening 38 includes a piston pin axis 40 arranged to align with or be co-axial with a longitudinal axis of the piston pin in the pin hole or opening 38 when the piston pin is assembled with the piston 10. The opening 38 includes an upper half opening 70 that is arranged above the piston pin axis 40. The opening 38 includes a lower half opening 72 that is arranged below the piston pin axis 40.

The plurality of upper lands 16*a*, 16*b*, 16*c* are arranged such that the first upper land 16*a* extends downwardly from the crown 12 as illustrated in FIG. 1. The third upper land 16*c* is located next to or directly adjacent the skirt 20. The second upper land 16*b* is positioned between the first upper land 16*a* and the third upper land 16*c*. The upper lands 16*a*, 16*b*, 16*c* have a corresponding outer upper surface 43*a*, 43*b*, 43*c* and a corresponding upper diameter 42*a*, 42*b*, 42*c*. In the illustrated embodiment, the upper diameters 42*a*, 42*b* of the upper lands 16*a*, 16*b* are the same or substantially the same. The upper diameter 42*c* of the third upper land 16*c* is larger than either of the first or second upper diameters 42*a*, 42*b*. As such, the third upper land 16*c* has the largest diameter 42*c* as compared to the upper diameters 42*a*, 42*b* of the first and second upper lands 16*a*, 16*b*, respectively. The third upper land 16*c* guides the piston 10 in the cylinder bore such that lateral contact due to the rocking or side to side movement of the piston 10 in the cylinder bore occurs more frequently on the downstroke of the piston 10 and there is reduced or limited lateral contact between the third upper land 16*c* and the cylinder bore on the upstroke of the piston 10.

The third upper land 16*c* acts as guide but has some lateral contact due to the piston tilt. The piston tilt varies throughout the cycle, on both upstroke and downstroke. In other embodiments, the second upper land 16*b* is not present, or there may be additional of the second upper lands 16*b* such that these additional upper lands are positioned between the first upper land 16*a* and the third upper land 16*c*. In any embodiment, the third upper land 16*c* that is positioned directly adjacent to the skirt 20 has the largest diameter. A thickness of each of the plurality of upper lands 16*a*, 16*b*, 16*c* may be different from one another.

The plurality of lower lands 34*a*, 34*b* are arranged such that the first lower land 34*a* is positioned next to or closest to the skirt 20. The second lower land 34*b* extends upwardly from the underside or bottom 22 relative to the longitudinal axis LA. The lower lands 34*a*, 34*b* have a corresponding outer lower surface 35*a*, 35*b* with corresponding lower diameter 44*a*, 44*b*, respectively. In the illustrated embodiment, the lower diameters 44*a*, 44*b* of the lower lands 34*a*, 34*b* are the same or substantially the same. The outer lower surfaces 35*a*, 35*b* with lower diameters 44*a*, 44*b* of the lower lands 34*a*, 34*b* are smaller than an outer skirt diameter 50 of a lower skirt 54 of the skirt 20. As such, the outer lower surfaces 35*a*, 35*b* of the lower lands 34*a*, 34*b* are recessed laterally relative to the outer lower skirt surface 51 of the lower skirt 54.

The piston 10 includes the skirt 20 that extends from the third upper land 16*c* to the lower ring groove 32*a*. The skirt 20 is a full or solid type skirt. The skirt 20 includes a first skirt pocket 52*a* and a second skirt pocket 52*b* wherein both of the first and second skirt pockets 52*a*, 52*b* are arranged above a lower skirt 54 relative to the longitudinal axis LA of the piston 10. The first and second skirt pockets 52*a*, 52*b* are positioned above the pin axis 40. The lower skirt 54 is positioned below the pin axis 40. The term "pocket" for the first and second skirt pockets 52*a*, 52*b* is defined as the portion of the piston 10 that spans between the lower skirt 54 and the third upper land 16*c*. The skirt 20 has a barrel shaped profile 74 that includes the lower skirt 54 and the third upper land 16*c*. The barrel shaped profile 74 is typically in microns.

The first skirt pocket 52*a* having a first outer skirt pocket surface 53*a* that extends circumferentially around half of the piston body to the upper half opening 70. The second skirt pocket 52*b* having a second outer skirt pocket surface 53*b* extends circumferentially around the other half of the piston body to the upper half opening 70. Together the first and second outer skirt pocket surfaces 53*a*, 53*b* of the first and second skirt pockets 52*a*, 52*b* extend around the outer circumference of the piston body and have an outer skirt pocket diameter 56 that is smaller than the outer skirt diameter 50 of the lower skirt 54. The first and second outer skirt pocket surfaces 53*a*, 53*b* of the first and second skirt pockets 52*a*, 52*b* have a skirt pocket height 58*a*, 58*b* that extend longitudinally from the third upper land 16*c* to the pin axis 40. The first and second skirt pockets 52*a*, 52*b* have a first and second skirt pocket cross-sectional thickness 60*a*, 60*b*. The first and second skirt pockets 52*a*, 52*b* are recessed relative to the lower skirt 54 therefore the first and second skirt pockets 52*a*, 52*b* do not contact the cylinder bore wall which avoids scuffing of the first and second skirt surfaces 53*a*, 53*b*. The first and second outer skirt pocket surfaces 53*a*, 53*b* of the first and second skirt pockets 52*a*, 52*b* are recessed laterally relative to the outer upper surfaces 43, 43*b*, 43*c* of the upper lands 16*a*, 16*b*, 16*c*.

The lower skirt 54 extends circumferentially around the piston body and is configured to extend around and below the lower half opening 72. The lower skirt 54 includes an outer lower skirt surface 51 having the outer skirt diameter 50 such that the outer skirt diameter 50 is larger than the outer skirt pocket diameter 56. The lower skirt 54 includes a variable lower skirt height 64 that extends from the pin axis 40 to the lower ring groove 32*a*. The variable lower skirt height 64 also extends from the lower half opening 72 to the lower ring groove 32*a*. The lower skirt 54 has a lower skirt cross-sectional thickness 62. The lower skirt 54 guides the piston 10 in the cylinder bore such that lateral contact due to the rocking or side to side movement of the piston 10 in the cylinder bore occurs on the downstroke of the piston 10. The outer skirt diameter 50 of the lower skirt 54 and the diameter 42*c* of the third upper land 16*c* are the same or substantially the same which results in both of the lower skirt 54 and the third upper land 16*c* guiding the piston 10 in the cylinder bore such that lateral contact due to the rocking or side to side movement of the piston 10 in the cylinder bore occurs on the downstroke of the piston 10. The outer lower skirt surface 51 of the lower skirt 54 is longitudinally aligned with the outer upper surface 43*c* of the third upper land 16*c*.

The first and second skirt pocket thickness 60*a*, 60*b* and the lower skirt thickness 62 are the same or substantially similar to each other to result in an overall uniform skirt thickness of the skirt 20 above and below the pin axis 40. The uniformity of the skirt pocket thickness 60*a*, 60*b*, and lower skirt thickness 62 provides the same thickness along the length of the piston 10. The uniformity of the skirt pocket thickness 60*a*, 60*b*, and lower skirt thickness 62 above and below the pin axis 40 provides a similar stiffness for the first and second skirt pockets 52*a*, 52*b* as compared to the lower skirt 54. As such, a combined stiffness of the first and the second skirt pockets 52*a*, 52*b* is substantially the same as a stiffness of the lower skirt 54. The uniformity of the skirt pocket thickness 60*a*, 60*b*, and lower skirt thickness 62 results in better skirt compliance as compared to skirt designs with a full length skirt without the first and second skirt pockets 52*a*, 52*b*.

The first and second skirt pockets 52*a*, 52*b* reduce the mass of the skirt 20 and the corresponding piston 10. The first and second skirt pockets 52*a*, 52*b* reduce the parasitic frictional losses and decrease the inertia of the piston 10. Another benefit of the reduction in mass of the piston 10 with the first and second skirt pockets 52*a*, 52*b*, is the reduced inertia of the piston 10 which reduces the impact of the piston lift off from the piston pin. Reducing lift off will be directly beneficial to the piston cap's (not shown here) structural integrity and fatigue life. The piston cap acts as a stopper during a piston lift off event, so reduced mass means less inertia load at the time of lift off which will benefit the piston cap. Reducing piston mass reduces the reciprocating mass which improves the overall mechanical efficiency of the crankshaft and engine.

The first and second skirt pockets 52*a*, 52*b* are beneficial for ease and simplicity in manufacturing of the skirt 10. Other techniques can also be used to form the first and second skirt pockets 52*a*, 52*b*, including machining, milling, printing, or otherwise forming the first and second skirt pockets 52*a*, 52*b*.

The plurality of lower lands 34*a*, 34*b* can limit cutter access to an interior surface of a piston such as pistons with bolted bearing shells and pistons with piston cooling holes on a bearing clamping face. Beneficially, the first and second skirt pockets 52*a*, 52*b* are on an exterior surface of the piston 10 for easy manufacturing thereof.

Engine 100 can be any type of engine, and in one specific embodiment is a combustion engine, such as a two-stroke or four-stroke, and includes a number of cylinders 120 each housing the piston 10. In an embodiment, engine 100 is operated by gaseous fuel, such as diesel, natural gas, propane, hydrogen, etc.

Figure 4:
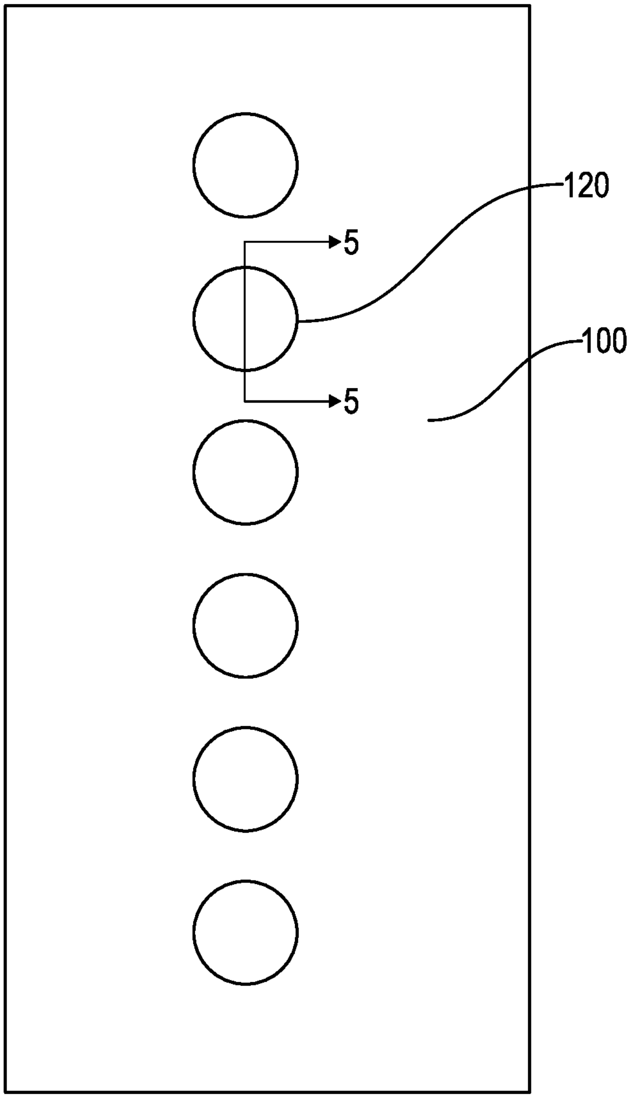
FIG. 4 is a top view of a schematic of an engine for assembly with the piston of the present disclosure.

In the illustrated embodiment in FIG. 4, engine 100 includes six cylinders 120. However, any number of cylinders 120 capable of being used for an engine 100 is contemplated. Engine 100 can be an in-line type engine with a single cylinder bank as shown in the illustrated embodiment, or other configuration including V-shaped cylinder arrangements, a W-type engine, or any engine arrangement with one or more cylinders 120. It is contemplated that engine 100 can be provided as part of a powertrain for a vehicle (not shown), or other applications that are also contemplated.

Figure 5:
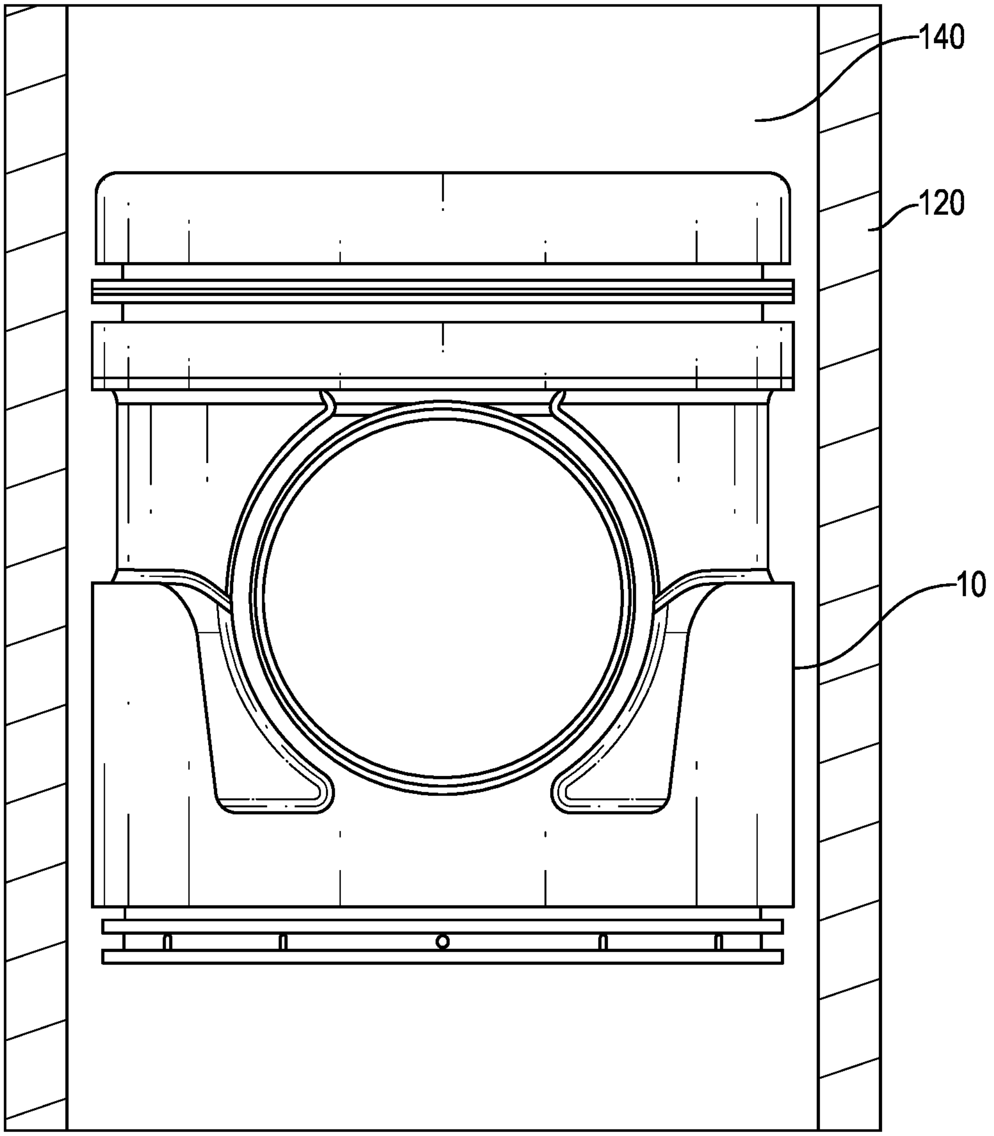
FIG. 5 is a cross-sectional view of a schematic of a cylinder of the engine of FIG. 4 for assembly with the piston of the present disclosure.

Referring further to FIG. 5, each cylinder 120 includes a combustion chamber 140 and the piston 10 movably disposed in combustion chamber 140. Each cylinder 120 may include other components and features not disclosed herein.

Figure 6:
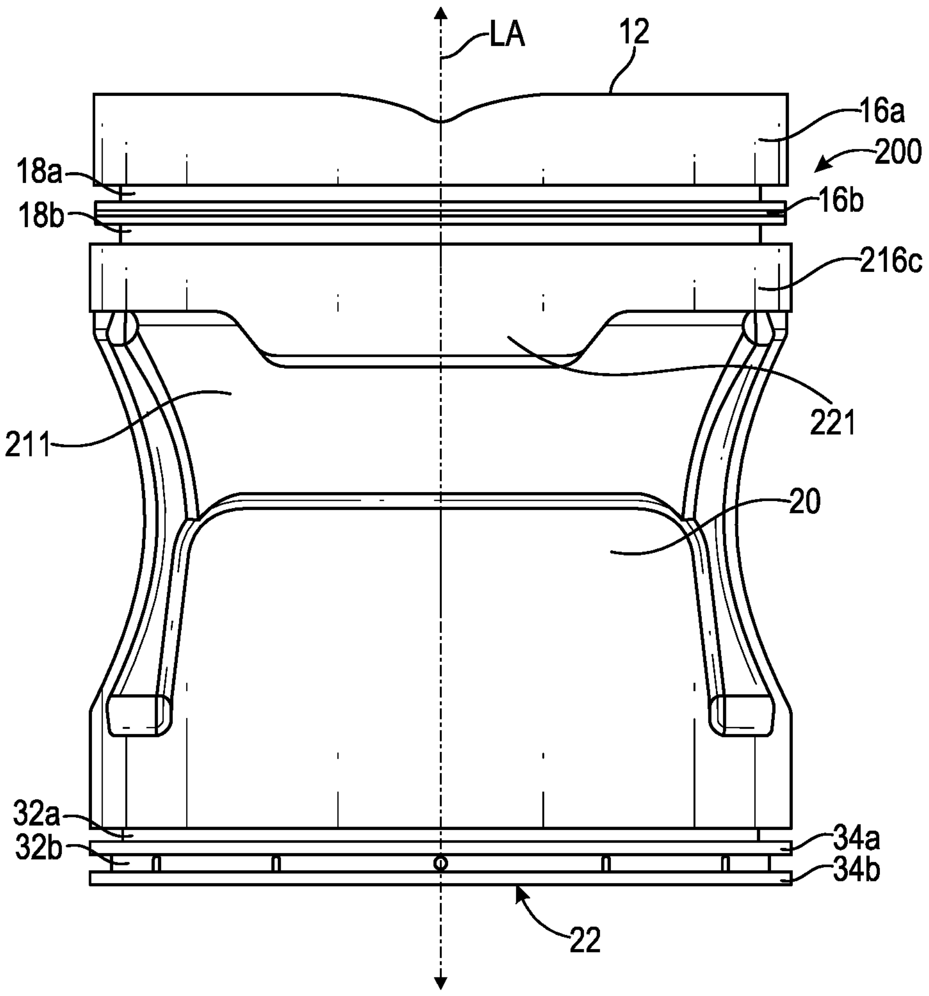
FIG. 6 is a side view of an alternative embodiment of a piston of the present disclosure.
Figure 7:
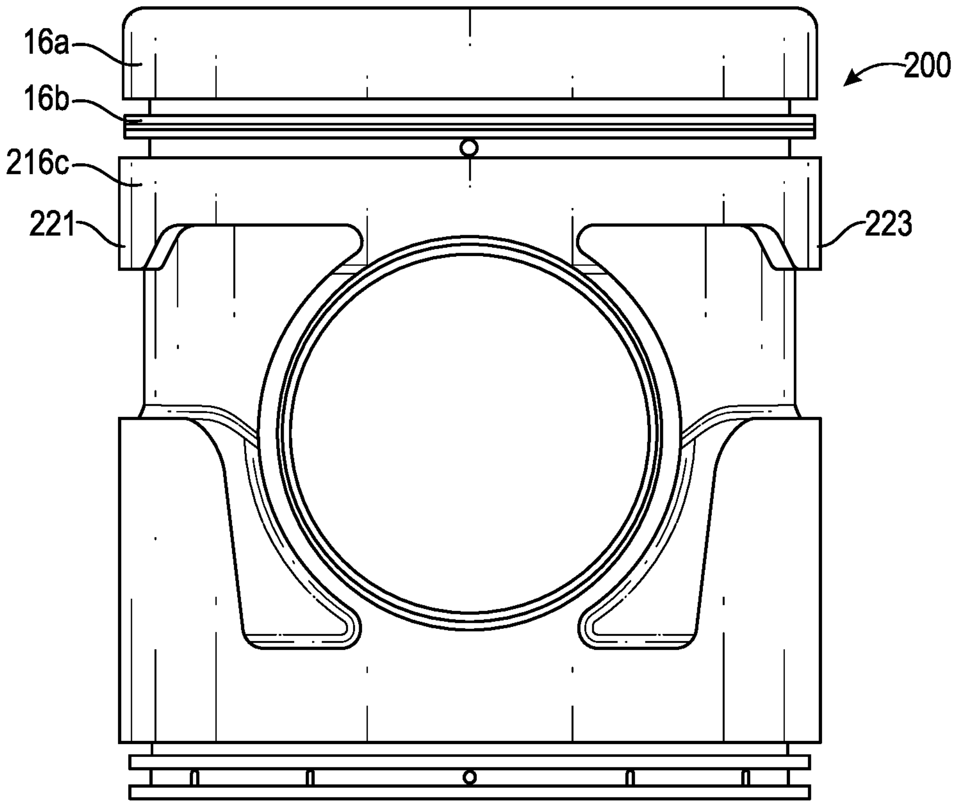
FIG. 7 is a side view of the piston of FIG. 6 that illustrates a thrust plane view of the present disclosure.

FIGS. 6-7 show various aspects of an alternative embodiment of a piston 200. The piston 200 is similar to the piston 10, unless noted otherwise. The piston 200 comprises a piston body 211 and a piston skirt 220. The piston body 211 includes a longitudinal axis LA that extends from a crown 12 to an underside or bottom 22. The piston 200 includes the crown 12, an upper land 16 (and may include a plurality of upper lands 16*a*, 16*b*, 216*c*), a plurality of upper ring grooves 18*a*, 18*b*, a skirt 20, the underside or bottom 22, a plurality of lower ring grooves 32*a*, 32*b*, and a plurality of lower lands 34*a*, 34*b*. Piston rings (not illustrated) may be provided in upper ring grooves 18*a*, 18*b*, and lower ring grooves 32*a*, 32*b*.

The third upper land 216*c* is located next to or directly adjacent the skirt 220. The second upper land 216*b* is positioned between the first upper land 216*a* and the third upper land 216*c*. The third upper land 216*c* has a first and second extension portions 221, 223 that span circumferentially around a portion of the piston 200. The first and second extension portions 221, 223 are extended on the thrust and antithrust planes circumferentially to between 30 and 90 degrees. In one embodiment, the first and second extension portions 221, 223 are extended on the thrust and antithrust planes circumferentially to roughly around 60 degrees. The first and second extension portions 221, 223 are added to better guide the piston 200 and to reduce the contact pressure. The first and second extension portions 221, 223 could be made bigger or smaller depending on the contact pressure observed in this area.

As is evident from the figures and text presented above, a variety of aspects of the present disclosure are contemplated. For example, one aspect is directed to a piston for assembly with a cylinder, the piston comprising: a piston body having a longitudinal axis that extends from a crown to a bottom, the piston body defining a pin opening having a piston pin axis; and a piston skirt assembled with and exterior to the piston body, the piston skirt includes: a first skirt pocket and a second skirt pocket, wherein the first and second skirt pockets are positioned above the piston pin axis; and a lower skirt positioned below the piston pin axis.

Another aspect of the piston is directed to the first and second skirt pockets and the lower skirt have substantially the same cross-sectional thickness along a portion of a length of each of the first and second skirt pockets and the lower skirt.

Another aspect of the piston is directed to, further comprising: an upper land located on the piston body and adjacent the pin opening, the upper land having an outer upper surface with an upper diameter; and wherein the lower skirt has an outer lower skirt surface with an outer skirt diameter, wherein the outer skirt diameter is the same as the upper diameter.

Another aspect of the piston is directed to, further comprising: a plurality of upper lands on the piston body between the crown and the pin opening, wherein one of the plurality of upper lands is adjacent the pin opening, wherein the one of the plurality of upper lands has an outer upper surface; and wherein each of the first and second skirt pockets has an outer skirt pocket surface that is recessed laterally relative to the outer upper surface of the one of the plurality of upper lands.

Another aspect of the piston is directed to the lower skirt has an outer lower skirt surface; wherein each of the first and second skirt pockets has an outer skirt pocket surface that is recessed laterally relative to the outer lower skirt surface of the lower skirt.

Another aspect of the piston is directed to each of the first and second skirt pockets has an outer skirt pocket surface that extends circumferentially around the piston body to the pin opening.

Another aspect of the piston is directed to further comprising: a plurality of upper lands on the piston body between the crown and the pin opening, wherein one of the plurality of upper lands is closest to the pin opening; and wherein the outer skirt pocket surface of each of the first and second skirt pockets extends longitudinally from the one of the plurality of upper lands to the pin axis.

Another aspect of the piston is directed to, further comprising: wherein the lower skirt has an outer lower skirt surface; and a plurality of lower lands on the piston body between the bottom and the lower skirt, wherein each of the plurality of lower lands has an outer lower surface that is recessed laterally relative to the outer lower skirt surface of the lower skirt.

Another aspect of the piston is directed to, further comprising: a plurality of upper lands on the piston body between the crown and the pin opening, wherein one of the plurality of upper lands is adjacent the pin opening, wherein the one of the plurality of upper lands has an outer upper surface; and wherein the lower skirt has an outer lower skirt surface that is longitudinally aligned with the outer upper surface of the one of the plurality of upper lands.

Yet another aspect of the piston is directed to a piston for assembly with a cylinder, the piston comprising: a piston body having a longitudinal axis that extends from a crown to a bottom; and a piston skirt assembled with and exterior to the piston body, wherein the piston skirt includes: a lower skirt having an outer lower skirt surface; and a first skirt pocket and a second skirt pocket, wherein the first and the second skirt pockets are adjacent to the lower skirt, wherein each of the first and second skirt pockets has an outer skirt pocket surface that is recessed laterally relative to the outer lower skirt surface of the lower skirt.

Another aspect of the piston is directed to the piston body defines a pin opening having a piston pin axis, wherein the lower skirt is positioned below the piston pin axis and the first and the second skirt pockets are positioned above the piston pin axis.

Another aspect of the piston is directed to the outer skirt pocket surfaces of the first and second skirt pockets extend circumferentially around the piston body to the pin opening.

Another aspect of the piston is directed to the outer lower skirt surface of the lower skirt extends circumferentially around the piston body and the pin opening.

Another aspect of the piston is directed to the piston skirt has a uniform cross-sectional thickness along at least a portion of a length of each of the first and second skirt pockets and the lower skirt.

Another aspect of the piston is directed to further comprising: a first upper land located on the piston body and adjacent the first and the second skirt pockets, the first upper land having an outer upper surface; and wherein the outer skirt pocket surface of each of the first and the second skirt pockets is recessed laterally relative to the outer upper surface of the first upper land.

Another aspect of the piston is directed to further comprising: a second upper land located on the piston body between the first upper land and the crown, the second upper land having an outer upper surface that is recessed laterally relative to the outer upper surface of the first upper land.

Another aspect of the piston is directed to the outer skirt pocket surface of each of the first and second skirt pockets extends longitudinally from the first upper land to the pin axis.

Another aspect of the piston is directed to the outer lower skirt surface of the lower skirt is longitudinally aligned with the outer upper surface of the one of the first upper land.

Another aspect of the piston is directed to further comprising: a plurality of lower lands on the piston body between the bottom and the lower skirt, wherein each of the plurality of lower lands has an outer lower surface that is recessed laterally relative to the outer lower skirt surface of the lower skirt.

Another aspect of the piston is directed to a combined stiffness of the first and the second skirt pockets is substantially the same as a stiffness of the lower skirt.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A piston for assembly with a cylinder, the piston comprising:
  - a piston body having a longitudinal axis that extends from a crown to a bottom, the piston body defining a pin opening having a piston pin axis;
  - a piston skirt assembled with and exterior to the piston body, the piston skirt includes:
    - a first skirt pocket and a second skirt pocket, wherein the first and second skirt pockets are positioned above the piston pin axis;
    - a lower skirt positioned entirely below the piston pin axis; and a lower land on the piston body between the bottom and the lower skirt, wherein the lower skirt has an outer lower skirt surface that extends from the piston pin axis to the lower land.

2. The piston of claim 1, wherein the first and second skirt pockets and the lower skirt have substantially the same cross-sectional thickness along a portion of a length of each of the first and second skirt pockets and the lower skirt.

3. The piston of claim 1, further comprising:

an upper land located on the piston body and adjacent the pin opening, the upper land having an outer upper surface with an upper diameter; and wherein the outer lower skirt surface includes an outer skirt diameter, wherein the outer skirt diameter is the same as the upper diameter.

4. The piston of claim 1, further comprising:

a plurality of upper lands on the piston body between the crown and the pin opening, wherein one of the plurality of upper lands is adjacent the pin opening, wherein the one of the plurality of upper lands has an outer upper surface; and wherein each of the first and second skirt pockets has an outer skirt pocket surface that is recessed laterally relative to the outer upper surface of the one of the plurality of upper lands.

5. The piston of claim 1, wherein each of the first and second skirt pockets has an outer skirt pocket surface that is recessed laterally relative to the outer lower skirt surface of the lower skirt.

6. The piston of claim 1, wherein each of the first and second skirt pockets has an outer skirt pocket surface that extends circumferentially around the piston body to the pin opening.

7. The piston of claim 6, further comprising:

a plurality of upper lands on the piston body between the crown and the pin opening, wherein one of the plurality of upper lands is closest to the pin opening; and wherein the outer skirt pocket surface of each of the first and second skirt pockets extends longitudinally from the one of the plurality of upper lands to the pin axis.

8. The piston of claim 1, wherein the lower land includes a plurality of lower lands on the piston body between the bottom and the lower skirt, wherein each of the plurality of lower lands has an outer lower surface that is recessed laterally relative to the outer lower skirt surface of the lower skirt.

9. The piston of claim 8, further comprising:

a plurality of upper lands on the piston body between the crown and the pin opening, wherein one of the plurality of upper lands is adjacent the pin opening, wherein the one of the plurality of upper lands has an outer upper surface; and wherein the outer lower skirt surface is longitudinally aligned with the outer upper surface of the one of the plurality of upper lands.

10. A piston for assembly with a cylinder, the piston comprising:

a piston body having a longitudinal axis that extends from a crown to a bottom, wherein the piston body defines a pin opening having a piston pin axis; and a piston skirt assembled with and exterior to the piston body, wherein the piston skirt includes:

a lower skirt having an outer lower skirt surface positioned entirely below the piston pin axis;

a first skirt pocket and a second skirt pocket, wherein the first and the second skirt pockets are adjacent to the lower skirt, wherein each of the first and second skirt pockets has an outer skirt pocket surface that is recessed laterally relative to the outer lower skirt surface of the lower skirt; and a lower land on the piston body between the bottom and the lower skirt, wherein the outer lower skirt surface of the lower skirt extends from the piston pin axis to the lower land.

11. The piston of claim 10, wherein the first and the second skirt pockets are positioned above the piston pin axis.

12. The piston of claim 11, wherein the outer skirt pocket surfaces of the first and second skirt pockets extend circumferentially around the piston body to the pin opening.

13. The piston of claim 11, wherein the outer lower skirt surface of the lower skirt extends circumferentially around the piston body and the pin opening.

14. The piston of claim 10, wherein the piston skirt has a uniform cross-sectional thickness along at least a portion of a length of each of the first and second skirt pockets and the lower skirt.

15. The piston of claim 10, wherein the lower land includes a plurality of lower lands on the piston body between the bottom and the lower skirt, wherein each of the plurality of lower lands has an outer lower surface that is recessed laterally relative to the outer lower skirt surface of the lower skirt.

16. The piston of claim 10, wherein a combined stiffness of the first and the second skirt pockets is substantially the same as a stiffness of the lower skirt.

17. The piston of claim 10, further comprising:

a first upper land located on the piston body and adjacent the first and the second skirt pockets, the first upper land having an outer upper surface; and wherein the outer skirt pocket surface of each of the first and the second skirt pockets is recessed laterally relative to the outer upper surface of the first upper land.

18. The piston of claim 17, further comprising:

a second upper land located on the piston body between the first upper land and the crown, the second upper land having an outer upper surface that is recessed laterally relative to the outer upper surface of the first upper land.

19. The piston of claim 17, wherein the outer skirt pocket surface of each of the first and second skirt pockets extends longitudinally from the first upper land to the pin axis.

20. The piston of claim 17, wherein the outer lower skirt surface of the lower skirt is longitudinally aligned with the outer upper surface of the one of the first upper land.

* * * * *